(12) United States Patent  
Hayakawa

(10) Patent No.: US 10,377,006 B2  
(45) Date of Patent: Aug. 13, 2019

(54) AIR BALANCE MECHANISM AND METHOD OF ADJUSTING POSTURE OF THE AIR BALANCE MECHANISM

(71) Applicant: FANUC CORPORATION, Yamanashi (JP)

(72) Inventor: Yuuta Hayakawa, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 34 days.

(21) Appl. No.: 15/782,823

(22) Filed: Oct. 12, 2017

(65) Prior Publication Data

US 2018/0104783 A1  Apr. 19, 2018

(30) Foreign Application Priority Data

Oct. 13, 2016  (JP) .................. 2016-201670

(51) Int. Cl.
*B23Q 11/00* (2006.01)
*B23Q 1/26* (2006.01)
*B23Q 1/38* (2006.01)
*B23Q 5/22* (2006.01)

(52) U.S. Cl.
CPC .......... *B23Q 11/0025* (2013.01); *B23Q 1/267* (2013.01); *B23Q 1/385* (2013.01); *B23Q 5/22* (2013.01); *B23Q 11/001* (2013.01); *B23Q 11/0017* (2013.01); *Y10T 408/92* (2015.01); *Y10T 409/309632* (2015.01); *Y10T 409/309688* (2015.01)

(58) Field of Classification Search
CPC .......... B23Q 1/01; B23Q 1/267; B23Q 1/385; B23Q 11/001; B23Q 11/0017; B23Q 11/0025; B23B 47/26; Y10T 408/91; Y10T 408/92; Y10T 409/309576; Y10T 409/309632; Y10T 409/309688; Y10T 409/309744; Y10T 409/3098

USPC ........ 409/235, 236, 237, 238, 239; 408/234, 408/235; 267/136; 188/322.19

See application file for complete search history.

(56) References Cited

U.S. PATENT DOCUMENTS

| | | | | |
|---|---|---|---|---|
| 5,988,959 A | * | 11/1999 | Sugata | B23Q 1/0009 408/143 |
| 6,883,789 B2 | * | 4/2005 | Kimura | B23Q 11/0025 267/137 |
| 6,915,879 B2 | * | 7/2005 | Kimura | F16F 9/363 184/24 |

(Continued)

FOREIGN PATENT DOCUMENTS

| JP | 2004-201239 A | 7/2004 |
|---|---|---|
| JP | 2008-204366 A | 9/2008 |

(Continued)

*Primary Examiner* — Sunil K Singh  
*Assistant Examiner* — Michael Vitale  
(74) *Attorney, Agent, or Firm* — Hauptman Ham, LLP

(57) ABSTRACT

An air balance mechanism includes a plate part, fixed shafts, and movable cylinders. A flange is provided at one end of each of the fixed shafts. The movable cylinders are movable relative to the fixed shafts. A space is formed below a lower surface of the flange. Further, the air balance mechanism includes fixing bolts and adjusting bolts. The fixing bolts fix the flange and a plate part at positions different from the space. The adjusting bolts are inserted into the plate part through the space for allowing the postures of the fixed shafts to be adjustable.

9 Claims, 4 Drawing Sheets

(56) References Cited

U.S. PATENT DOCUMENTS 7,424,846 B2 * 9/2008 Tanizaki .................. B23Q 1/38
409/237
2009/0278291 A1 * 11/2009 Kitaura ............. B23Q 11/0025
267/137

FOREIGN PATENT DOCUMENTS

JP          2009-197860 A      9/2009
WO          WO-8803257 A1 *    5/1988    ........... G01B 5/0016

\* cited by examiner

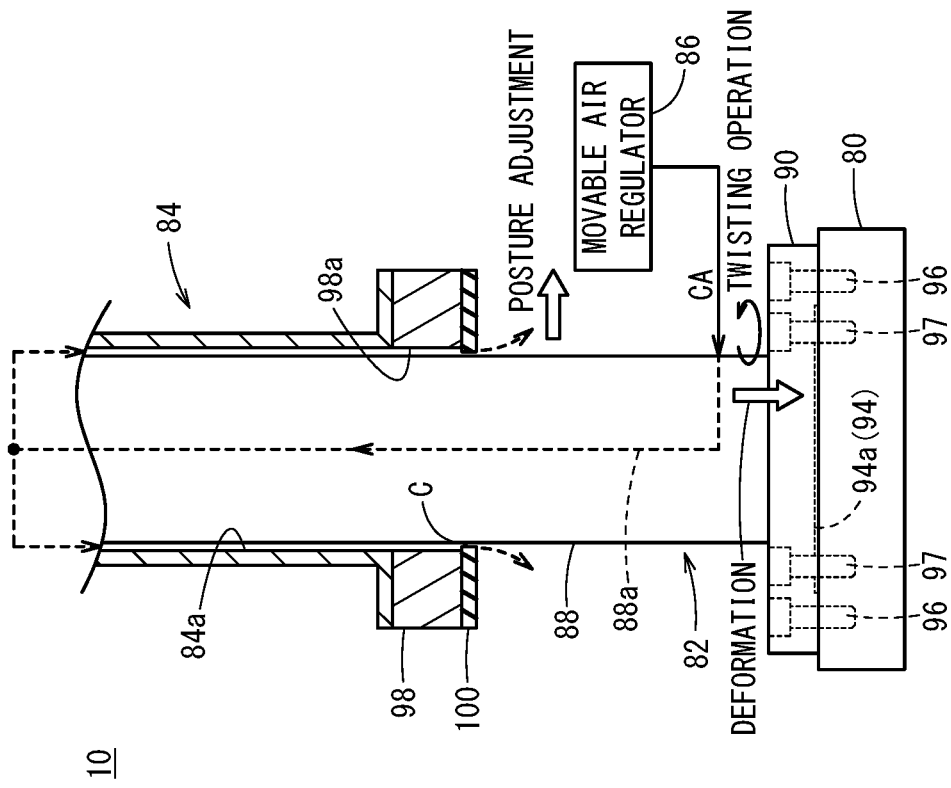
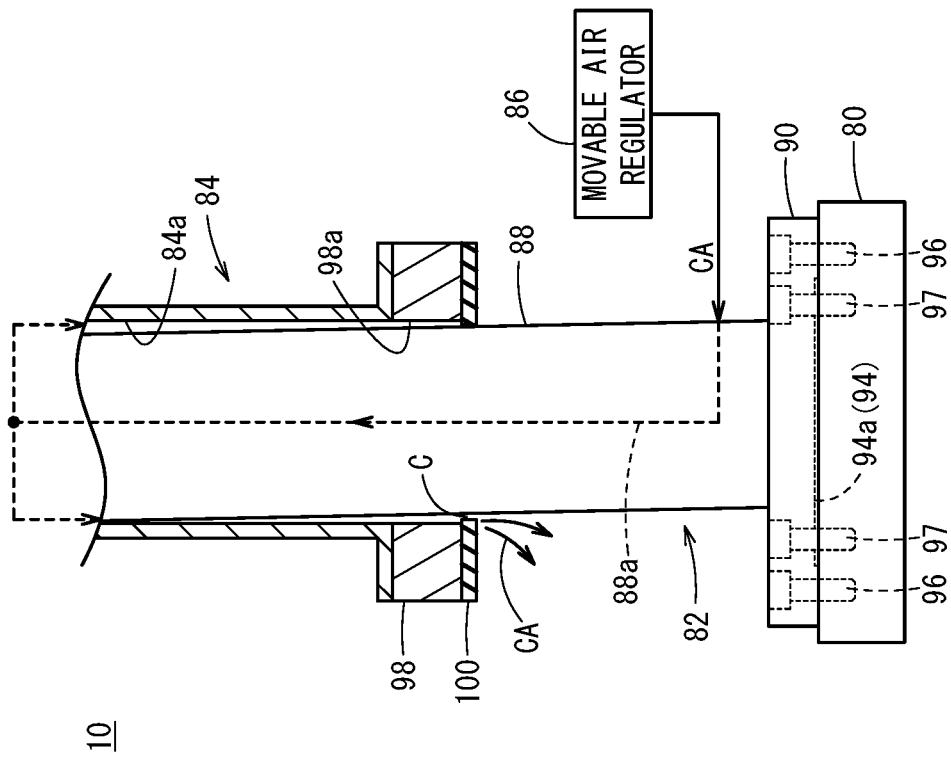

AIR BALANCE MECHANISM AND METHOD OF ADJUSTING POSTURE OF THE AIR BALANCE MECHANISM

CROSS-REFERENCE TO RELATED APPLICATION

This application is based upon and claims the benefit of priority from Japanese Patent Application No. 2016-201670 filed on Oct. 13, 2016, the contents of which are incorporated herein by reference.

BACKGROUND OF THE INVENTION

Field of the Invention

The present invention relates to an air balance mechanism for assisting vertical movement of a movable element, and a method of adjusting the posture of the air balance mechanism.

Description of the Related Art

Some machine tools have an air balance mechanism at a position adjacent to a movable element which moves along a vertical axis. For example, as disclosed in Japanese Laid-Open Patent Publication No. 2008-204366, an air balance mechanism (balancing apparatus) provided for a machine tool functions as a gravity canceller which receives the weight of a movable element by air pressure, so as to smoothly move the movable element.

Normally, the air balance mechanism of this type includes a fixed shaft standing upright along the vertical axis, and a movable cylinder which covers the fixed shaft and is coupled to the movable element. An air in the movable cylinder is regulated to move the movable cylinder relative to the fixed cylinder. According to the disclosure of Japanese Laid-Open Patent Publication No. 2008-204366, a cylinder tube of the air cylinder is positioned on the fixed side, and a piston of the air cylinder coupled to the movable element is positioned on the movable side.

SUMMARY OF THE INVENTION

In an air balance mechanism, a fixed shaft and a movable cylinder are provided in a manner to maintain the non-contact state between the fixed shaft and the movable shaft. In this manner, application of resistance from the fixed shaft to the movable cylinder is suppressed. Thus, it is possible to control the displacement of the movable cylinder accurately. For this purpose, the fixed shaft needs to be assembled highly accurately in a manner to take a posture in parallel to the vertical axis. For example, in a conventional approach, the posture of the fixed shaft is adjusted by providing a thin shim at the lower end of the fixed shaft. However, in the case of adjusting the posture of the fixed shaft using the shim, the adjusting operation is laborious, and it is difficult to perform the adjustment operation accurately.

The present invention has been made to solve the problems of the above type, and an object of the present invention is to provide an air balance mechanism and a method of adjusting the posture of the air balance mechanism in which, with the simple structure, it is possible to adjust the posture of a shaft highly accurately in a short period of time.

In order to achieve the above object, an air balance mechanism according to the present invention includes a mount part, a shaft provided with a flange at one end thereof, and a cylinder configured to cover the shaft, and configured to be movable relative to the shaft. The flange is fixed to the mount part. A clearance is provided at a contact portion of at least one of the mount part and the flange. The air balance mechanism further includes at least one fixing bolt configured to fix the flange and the mount part at a position different from the clearance, and at least one adjusting bolt configured to be screwed into the mount part through the flange at a position overlapped with the clearance for allowing posture of the shaft to be adjustable.

With the simple structure including the clearance, the fixing bolt, and the adjusting bolt, the air balance mechanism can adjust the posture of the shaft highly accurately in a short period of time. That is, the operator fixes the flange of the shaft and the mount part using the fixed bolt, and twists the adjusting bolt passing through the clearance. As a result, the portion of the flange overlapped with the clearance is deformed slightly, and the posture of the shaft changes in correspondence with the deformation. Therefore, by changing the screw-in level of the adjusting bolt as necessary, the operator can accurately adjust the posture of the shaft with the reduced labor.

In this case, preferably, the air balance mechanism includes an air supply unit configured to supply an air into the cylinder at time of adjusting the posture of the shaft.

The air supply unit supplies the air into the cylinder at the time of adjusting the posture using the adjusting bolt. In this manner, the operator can determine whether or not the posture of the shaft is normal, based on the change in the quantity of air released from the cylinder. Thus, it becomes possible to achieve further improvement in the efficiency of the operation.

Further, preferably, the flange has a perfectly circular shape in a plan view and the flange is fixed in a manner that an axial center of a portion extending from the shaft is aligned with the central point of the flange, the clearance is formed by a shallow recess recessed inward of the flange, and the recess has a perfectly circular shape concentric with the flange and a diameter of the recess is larger than an outer diameter of the portion extending from the shaft.

The axial center of the portion extending from the shaft is aligned with the center point of the flange. In the structure, the load of the shaft applied to the mount part is distributed uniformly. Further, the recess has the perfectly circular shape concentric with the flange and the diameter of the recess is larger than the outer diameter of the portion extending from the shaft. In the structure, by the twisting operation of the adjusting bolt, the air balance mechanism can facilitate deformation of the portion having the recess, and adjust the posture of the shaft.

In addition to adopting the above structure, the fixing bolt and the adjusting bolt may be arranged in parallel to each other in a radial direction of the flange.

Since the fixing bolt and the adjusting bolt may be provided in parallel to each other in the radial direction of the flange, when the adjusting bolt is twisted, the fixing bolt functions as a pivot point (fulcrum), and the flange can be deformed easily in the radial direction on the opposite side.

Further, preferably, the mount part includes a plurality of female screws configured to allow the fixing bolt and the adjusting bolt to be screwed into the female screws, and in the female screws, tightening force of the adjusting bolt is larger than tightening force of the fixing bolt.

Further, in the air balance mechanism, the tightening force of the adjusting bolt is larger than the tightening force of the fixing bolt. Therefore, the posture of the shaft adjusted by the adjusting bolt can be maintained securely.

Further, advantageously, the fixing bolt and the adjusting bolt have the same shape.

The operator should simply prepare the bolts having the same shape to perform the adjusting operation. Therefore, further improvement in the efficiency of the operation is achieved.

Further, in order to achieve the above object, a method of adjusting the posture of an air balance mechanism is provided. The air balance mechanism includes a mount part, a shaft, and a cylinder configured to cover the shaft, and configured to be movable relative to the shaft. A flange fixed to the mount part is provided at one end of the shaft. A clearance is provided at a contact portion of at least one of the mount part and the flange. The method includes the steps of fixing the flange and the mount part at a position different from the clearance using at least one fixing bolt, and adjusting the posture of the shaft after the fixing step, by screwing at least one adjusting bolt into the mount part through the flange at a position different from the clearance.

In this case, advantageously, in the adjusting step, an air is supplied into the cylinder by an air supply unit to adjust the posture of the shaft based on the quantity of the air released from the cylinder.

In the air balance mechanism and the method of adjusting the posture of the air balance mechanism, with the simple structure, it is possible to adjust the posture of the shaft high accurately in a short period of time.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 4A is a first view showing a method of adjusting the posture of the fixed shaft; and FIG. 4B is a second view showing the method of adjusting the posture of the fixed shaft.

DESCRIPTION OF THE PREFERRED EMBODIMENTS

Hereinafter, a preferred embodiment of an air balance mechanism, and a method of adjusting the posture of the air balance mechanism according to the present invention will be described in detail with reference to the accompanying drawings.

Figure 1:
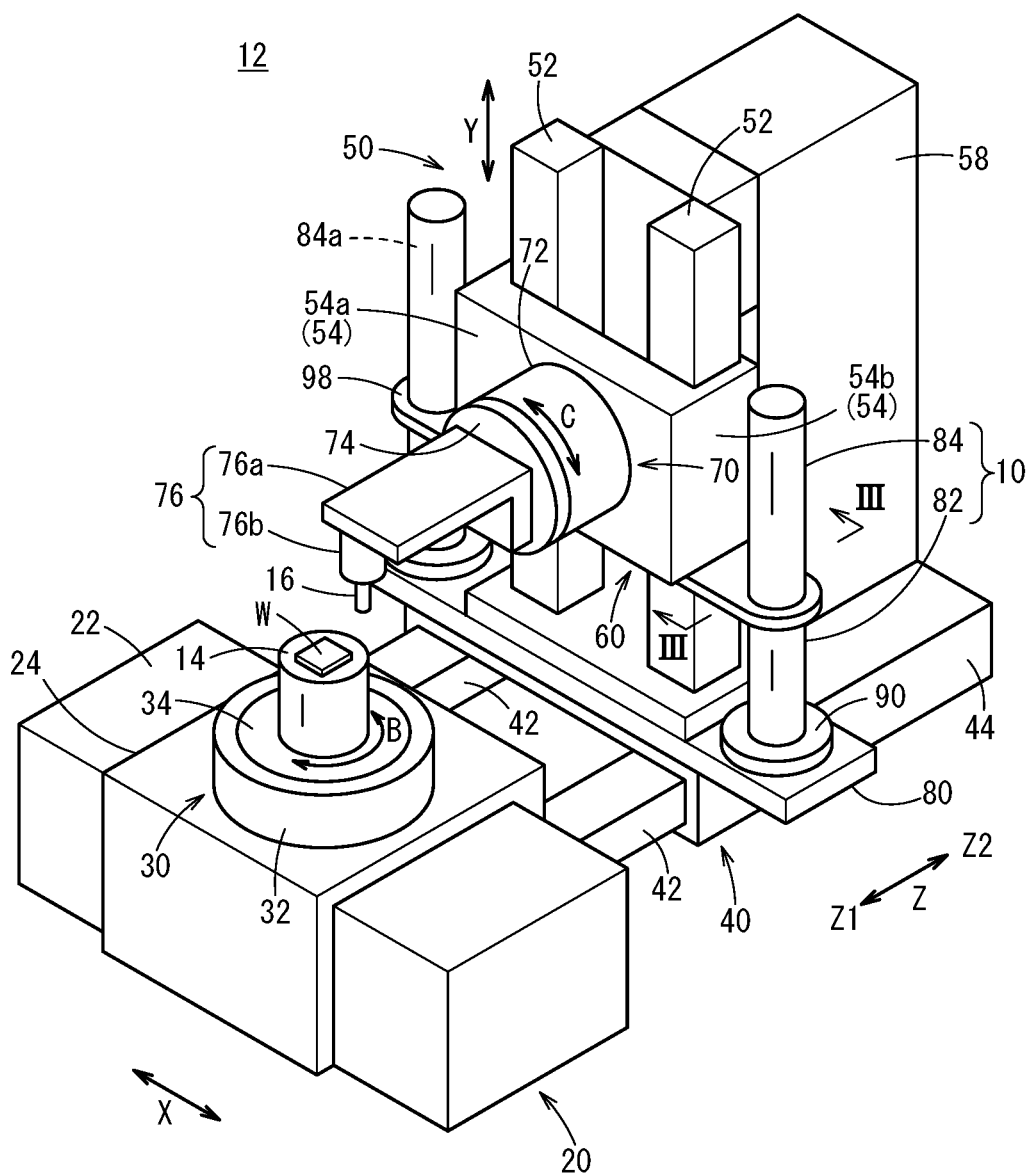
FIG. 1 is a perspective view showing a machine tool including an air balance mechanism according to an embodiment of the present invention.

As shown in FIG. 1, an air balance mechanism 10 according to the embodiment of the present invention is provided as a gravity canceller for a movable element (Y-axis slider 54 described later) which moves in a Y-axis direction (vertical direction) as the direction of a vertical axis of a machine tool 12. By the air balance mechanism 10, movement control of the movable element can be implemented easily. In particular, in the air balance mechanism 10 according to the embodiment of the present invention, the posture of the installed air balance mechanism 10 can be adjusted highly accurately in a short period of time, and improvement in the assembling performance of the machine tool 12 is achieved.

Hereinafter, for ease of understanding of the air balance mechanism 10 according to the embodiment of the present invention, the machine tool 12 equipped with the air balance mechanism 10 will be described firstly.

The machine tool 12 machines a workpiece W. For this purpose, the machine tool 12 is configured to perform five-axis machining operation under control operation of a numeric control device (not shown). Specifically, the machine tool 12 is capable of moving a table 14 back and forth in X-axis directions, and rotates the table 14 about a B-axis as an axial center extending in the vertical direction. The workpiece W is placed on the table 14. Further, the machine tool 12 is capable of moving a tool 16 for machining the workpiece W, back and forth in Z-axis directions (closer to or away from the table 14) and Y-axis directions, and capable of indexing the tool 16 about a C-axis as an axial center extending in a horizontal direction (positioning the posture of the tool 16).

That is, the machine tool 12 according to the embodiment of the present invention includes a one swing axis in the table 14, and one swing axis in the spindle, in addition to three feed axes. It should be noted that the machine tool 12 to which the air balance mechanism 10 is applied is not limited especially in respect of the number of axes. Further, the machine tool 12 is not limited in respect of the installation state of the swing axes as well. For example, the air balance mechanism 10 is applicable to an apparatus having two swing axes on the part of the table 14, or an apparatus having two swing axes on the part of the tool 16.

The machine tool 12 has a feed axis mechanism 20 for the X-axis. The feed axis mechanism 20 includes an X-axis guide body 22, and an X-axis slider 24 capable of moving back and forth on the X-axis guide body 22. The machine tool 12 has a rotation mechanism 30 for the B-axis. The rotation mechanism 30 includes a stator 32 fixed to an upper part of the X-axis slider 24, and a rotor 34 provided inside the stator 32, and rotatable relative to the stator 32. The table 14 for fixedly holding the workpiece W is provided on an upper surface of the rotor 34. The workpiece W is fixedly positioned on the table 14.

The machine tool 12 has a feed axis mechanism 40 for the Z-axis. The feed axis mechanism 40 includes a pair of Z-axis guide bodies 42 and a Z-axis slider 44 capable of moving back and forth along the pair of Z-axis guide bodies 42. A feed axis mechanism 50 for the Y-axis is provided above the Z-axis slider 44.

The feed axis mechanism 50 for the Y-axis includes a pair of Y-axis guide bodies 52 and a Y-axis slider 54 capable of moving back and forth along the pair of Y-axis guide bodies 52. Further, the feed axis mechanism 50 for the Y-axis according to the embodiment of the present invention includes a support body 58 fixed to an upper part of the Z-axis slider 44 to stand upright, and the air balance mechanism 10 for assisting vertical movement of the Y-axis slider 54. Static pressure bearings for supplying fluid (air or oil) are provided between the guide bodies and the sliders of the feed axis mechanism 20 for the X-axis, the feed axis mechanism 40 for the Z-axis, and the feed axis mechanism 50 for the Y-axis. By the static pressure bearings, improvement in the sliding performance of the sliders is achieved.

The pair of Y-axis guide bodies 52 extend in parallel to each other in the moving direction of the Y-axis slider 54 (in the Y-axis direction) to guide the movement of the Y-axis slider 54. Each of the Y-axis guide bodies 52 is in the form of a rectangular pillar having a predetermined length. The Y-axis guide bodies 52 are positioned remotely from each other, and stand upright in the vertical direction. Among four side surfaces of the pair of Y-axis guide bodies 52, side surfaces that do not face each other serve as slide surfaces for allowing the Y-axis slider 54 to slide along the slide surfaces.

Further, the pair of Y-axis guide bodies 52 are fixed to the support body 58 on the Z2 side in FIG. 1 in a manner that the vertical posture of the Y-axis guide bodies 52 is maintained. In FIG. 1, though the support body 58 is in the form of a rectangular parallelepiped block, the support body 58 should be in the form of a hollow frame for achieving weight reduction of the Y-axis slider 54, advantageously.

The Y-axis slider 54 includes a fixed wall 54a and a pair of guide walls 54b that are formed integrally. A rotation mechanism 70 for the C-axis is fixed to the fixed wall 54a. The pair of guide walls 54b are provided on both sides of the fixed wall 54a. The fixed wall 54a has a flat surface, and has a thickness sufficient to attain the rigidity which makes it possible to support the rotation mechanism 70 for the C-axis. The pair of guide walls 54b surround each of the Y-axis guide bodies 52 like a hook. The pair of guide walls 54b suppress deviation of the Y-axis slider 54 in the X-axis direction and Z-axis direction, while allowing the Y-axis slider 54 to slide in the vertical direction.

The rotation mechanism 70 for the C-axis is made up of a stator 72 fixed to the Y-axis slider 54 and a rotor 74 which is rotatable relative to the stator 72. The rotor 74 is partially accommodated inside the stator 72, and a surface of the rotor 74 opposite to the Y-axis slider 54 (Z1 side in FIG. 1) is exposed. A spindle mechanism 76 is attached to a front end surface of the rotor 74 (on the Z1 side in FIG. 1). The spindle mechanism 76 drives the tool 16 to machine the workpiece W.

Though not limited specially, the spindle mechanism 76 is used in machining operations such as draw cutting, trimming, and/or cutting. For example, the spindle mechanism 76 includes an L-shaped support section 76a, and a spindle section 76b for supporting the tool 16 by an extension part of the support section 76a such that the tool 16 is rotated about the axis of the tool 16.

A static pressure bearing is provided between the stator 72 and the rotor 74 of the rotation mechanism 70 for the C-axis. In the presence of the static pressure bearing, when oil (fluid) is supplied, the rotor 74 moves smoothly relative to the stator 72. Further, the rotation mechanism 70 includes an oil supply mechanism (not shown) for supplying the oil to the static pressure bearing, and a drainage mechanism (not shown) for discharging the oil from the static pressure bearing.

As described above, a movable element 60 which moves in the vertical direction includes the Y-axis slider 54, the rotation mechanism 70 for the C-axis, the spindle mechanism 76, and the tool 16. For this reason, the overall weight of the movable element 60 is high (e.g., about 200 kg), and it is difficult to implement movement control by a numeric value control device highly accurately. Therefore, the air balance mechanism 10 according to the embodiment of the present invention is configured to cancel the gravity of the movable element 60 (Y-axis slider 54).

The air balance mechanism 10 supports, and displaces the movable element 60 based on the change in the air pressure. The air balance mechanism 10 includes a plate part 80 attached to the Z-axis slider 44, a pair of fixed shafts 82 fixed to upper surfaces of the plate part 80 on both sides, and a pair of movable cylinders 84 externally fitted to the fixed shafts 82, respectively, in a relatively movable manner. Further, the air balance mechanism 10 includes a movable air regulator 86 (see FIG. 2) for supplying/discharging a movable air to/from the inside of the movable cylinders 84.

The plate part 80 of the air balance mechanism 10 is an installation member (mount part) for installing the pair of fixed shafts 82 and the pair of movable cylinders 84 at the Z-axis slider 44. The plate part 80 has a rectangular shape having long sides in the X-axis direction and short sides in the Z-axis direction. The plate part 80 is provided at the Z-axis slider 44 in a manner that both sides of the plate part 80 protrude outward in the X-axis direction. The Z-axis slider 44 and the plate part 80 are securely fixed together by joining means, e.g., by welding. The fixed shafts 82 of the air balance mechanism 10 may be fixed to the Z-axis slider 44 directly without using the plate part 80. In this case, the Z-axis slider 44 serves as a mount part of the present invention.

Figure 2:
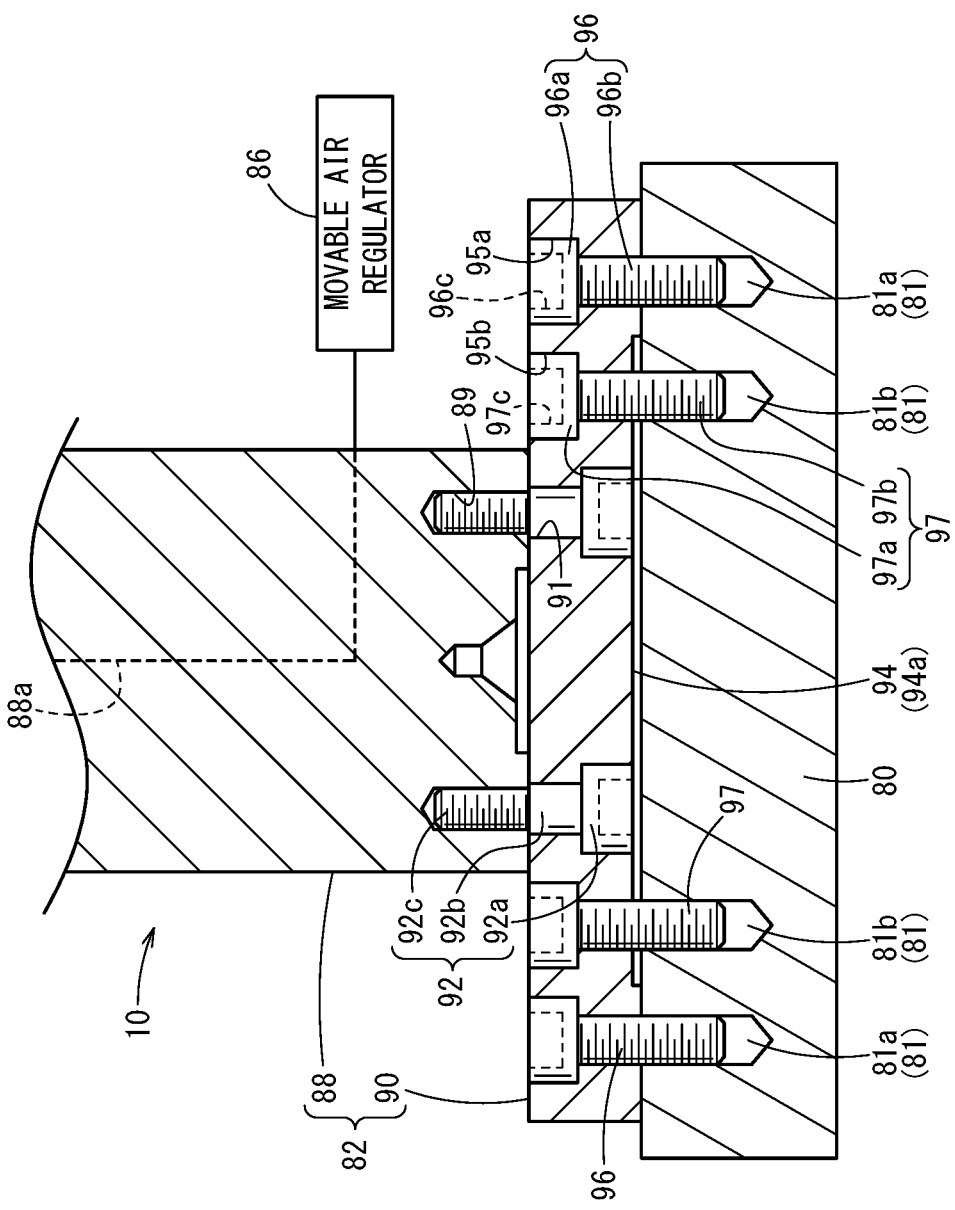
FIG. 2 is a side cross sectional view showing a state where a plate part and a fixed shaft of the air balance mechanism in FIG. 1 are coupled together.

The plate part 80 has a thickness sufficient to attain the rigidity which makes it possible to support the movable element 60. The plate part 80 has a flat upper surface. When the Z-axis slider 44 is installed, the plate part 80 is provided horizontally (in parallel to the X-Z plane). As shown in FIG. 2, a plurality of mount part side female screws 81 are provided in the upper surface of the plate part 80. Fixing bolts 96 and adjusting bolts 97 described later are screwed into the plurality of mount part side female screws 81.

That is, in a cross sectional side view, the plurality of mount part side female screws 81 include mount part side fixing female screws 81a provided outside the plate part 80, corresponding to the fixing bolts 96, and mount part side adjusting female screws 81b provided inside the mount part side fixing female screws 81a, corresponding to the adjusting bolts 97. The mount part side female screws 81 are formed from the upper surface of the plate part 80 to a predetermined depth (e.g., the mount part side female screws 81 are longer than male screws 96b of the fixing bolts 96 and male screws 97b of the adjusting bolts 97 in the axial direction).

As shown in FIG. 1, the pair of fixed shafts 82 are provided in parallel to the moving direction of the Y-axis slider 54 (i.e., vertical axis of the machine tool 12), and guides the movable cylinder 84 which moves relatively. Each of the fixed shafts 82 is formed by assembling a cylindrical shaft body 88 and a flange 90 together. The shaft body 88 has a predetermined length in the axial direction. The flange 90 is coupled to a lower end of the shaft body 88, and fixed to the plate part 80. The shaft body 88 and the flange 90 may be formed integrally.

The shaft body 88 of each fixed shaft 82 has a curved outer circumferential surface without any unevenness, and the outer diameter of the shaft body 88 is constant in the axial direction. The shaft body 88 is fixed to the plate part 80 through the flange 90 such that the axial center of the shaft body 88 stands upright.

As shown in FIG. 2, a flow passage 88a as a passage of the movable air is provided inside the shaft body 88. A connector (not shown) connecting the flow passage 88a to the outside is provided at a lower end of the shaft body 88, and the flow passage 88a is connected to the movable air regulator 86 through the connector and a tube. Further, a plurality of body side female screws 89 are provided at a lower end of the shaft body 88. The plurality of body side female screws 89 are arranged at equal intervals in a circumferential direction, at positions remote from the axial center of the shaft body 88 in the radial direction.

Coupling bolts 92 are screwed into the body side female screws 89 through the flange 90. Each of the coupling bolts 92 includes a head 92a, a body 92b, and a male screw 92c. The body 92b extends continuously from the head 92a, and has a diameter smaller than the head 92a. The male screw 92c extends continuously from the body 92b, and has a screw thread in its outer circumferential surface.

The flange 90 of the fixed shaft 82 is coupled to the shaft body 88 so as to support the shaft body 88 in the upright posture. The flange 90 has a perfectly circular shape, and the outer diameter of the flange 90 is larger than the outer diameter of the shaft body 88 in a plan view (see also FIG. 3). Using the coupling bolts 92, the flange 90 is coupled to the shaft body 88 such that the axial center of the shaft body 88 is placed in perpendicular to the surface of the flange 90, and positioned at its central point. In the structure, when the flange 90 is coupled to the shaft body 88, part of the flange 90 protrudes outward from the shaft body 88 in the radial direction to some extent. Further, the flange 90 has a predetermined thickness to attain the rigidity which makes it possible to support the shaft body 88 stably.

The upper surface of the flange 90 has a flat shape at its central position, for surface to surface contact with the lower end surface of the shaft body 88. In contrast, a recess 94 is formed in the lower surface of the flange 90. The recess 94 is recessed inward (in the thickness direction) of the flange 90. In the state where the plate part 80 is coupled to the flange 90, the recess 94 forms a space 94a (clearance) between the plate part 80 and the flange 90.

The recess 94 has a perfectly circular shape concentric with the flange 90. The diameter of the recess 94 is larger than the outer diameter of the shaft body 88. Further, the recess 94 is shallow (e.g., having the depth of 5 mm or less) from the lower surface of the flange 90 to attain the sufficient rigidity of the flange 90. The recess 94 may be provided only in the plate part 80, or both of the flange 90 and the plate part 80.

The recess 94 has a flat bottom surface. A plurality of flange holes 91 are formed at predetermined positions of the bottom surface of the recess 94, for allowing the coupling bolts 92 to be screwed into the flange holes 91. Each of the flange holes 91 is positioned to face the body side female screw 89 of the shaft body 88, and a step is provided inside the flange hole 91. At the time of coupling the shaft body 88 with the flange 90, the coupling bolts 92 are inserted from the bottom side of the flange 90. The head 92a of each of the coupling bolts 92 is engaged with the step, and the male screw 92c is brought into screw engagement with the body side female screw 89. By the screw engagement of the coupling bolts 92, the shaft body 88 is coupled to the flange 90 securely.

Further, the exposed portion of the flange 90 protruding outward from the shaft body 88 in the radial direction is coupled to the plate part 80 in a manner that the posture of the fixed shaft 82 is adjustable. For this purpose, the flange 90 has a plurality of fixing side female screws 95a and a plurality of adjusting side female screws 95b (in the embodiment of the present invention, eight fixing side female screws 95a and eight adjusting side female screws 95b, see also FIG. 3). The fixing bolts 96 are screwed into the fixing side female screws 95a, and the adjusting bolts 97 are screwed into the adjusting side female screw 95b.

The fixing bolt 96 and the adjusting bolt 97 may be made of the same material, and may have the same shape. That is, the same bolt can be screwed into either the fixing side female screw 95a or the adjusting side female screw 95b. If the bolt is screwed into the fixing side female screw 95a, the bolt is referred to as the fixing bolt 96, and if the bolt is screwed into the adjusting side female screw 95b, the bolt is referred to as the adjusting bolt 97. It should be noted that the shapes of the fixing bolt 96 and the mount part side fixing female screw 81a and the fixing side female screw 95a corresponding to the fixing bolt 96 may be different from the shapes of the adjusting bolt 97 and the mount part side adjusting female screw 81b and the adjusting side female screw 95b corresponding to the adjusting bolt 97.

Each of the fixing bolts 96 has a head 96a and the male screw 96b which extends continuously from the head 96a. The male screw 96b has a screw thread on an outer circumferential surface. Likewise, each of the adjusting bolts 97 has a head 97a and the male screw 97b which extends continuously from the head 97a. The male screw 97b has a screw thread on an outer circumferential surface. Further, an operation hole 96c is formed in an upper surface of the head 96a to twist the fixing bolt 96, and an operation hole 97c is formed in an upper surface of the head 97a to twist the adjusting bolt 97 (see FIG. 3).

Figure 3:
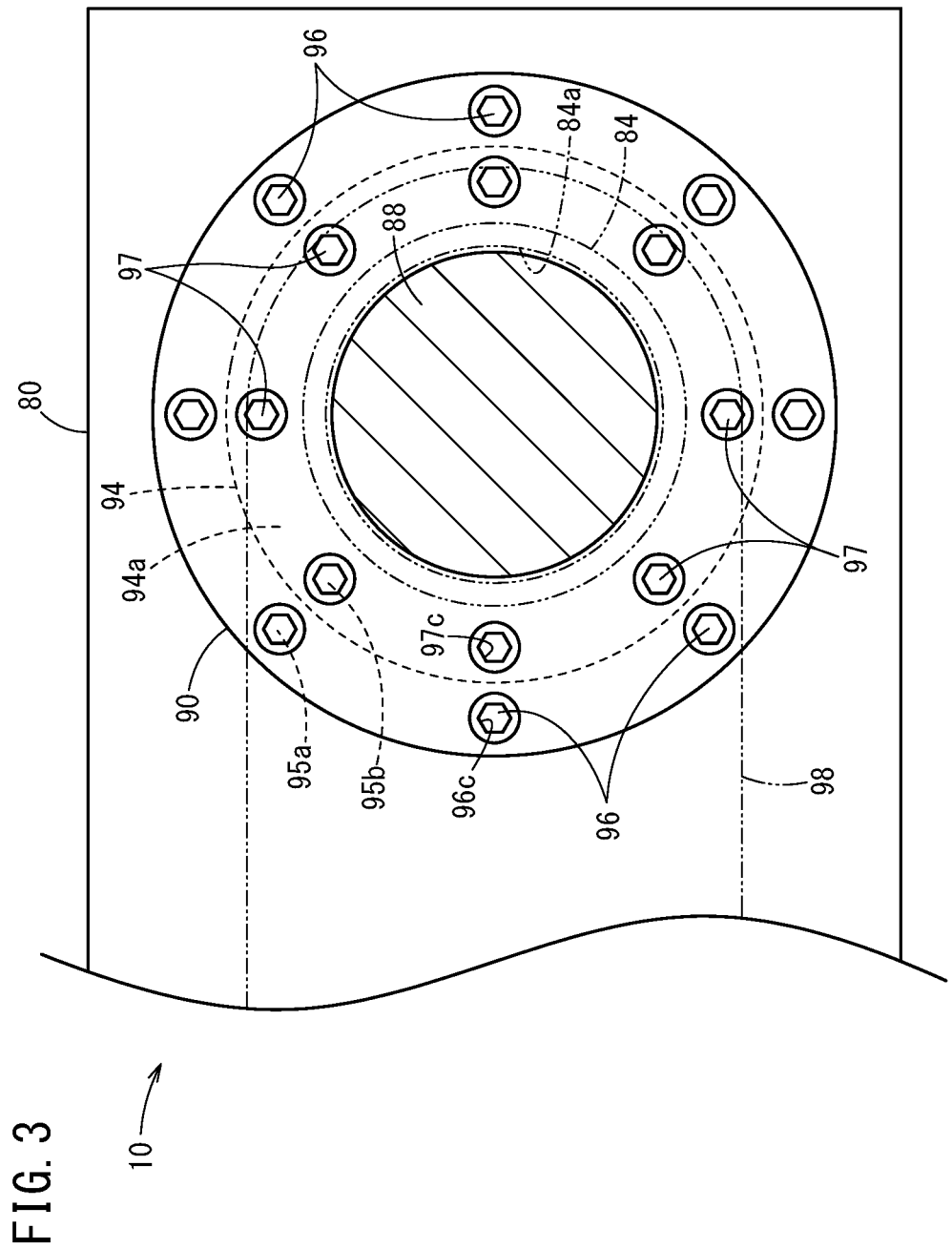
FIG. 3 is a cross sectional view taken along a line III-III in FIG. 1.

As shown in FIGS. 2 and 3, each of the fixing side female screws 95a and each of the adjusting side female screws 95b are arranged in parallel to each other in the radial direction at the exposed portion of the flange 90. Further, the fixing side female screws 95a are arranged at equal intervals in the circumferential direction of the exposed part (i.e., at intervals of 45°), and the adjusting side female screws 95b are arranged at equal intervals in the circumferential direction of the exposed part (i.e., at intervals of 45°). Further, the fixing side female screws 95a and the adjusting side female screws 95b pass through the flange 90 vertically. A step is formed inside each of the fixing side female screws 95a, for engagement with the head 96a of the fixing bolt 96, and a step is formed inside each of the adjusting side female screws 95b, for engagement with the head 97a of the adjusting bolt 97.

The number of the fixing side female screws 95a and the number of the adjusting side female screws 95b are not limited specially, and can be designed freely. The number of the fixing side female screws 95a may be different from the adjusting side female screws 95b. For example, four fixing side female screws 95a may be present in the circumferential direction at the exposed portion, and three adjusting side female screws 95b may be present in the circumferential direction at the exposed portion. If the number of the adjusting side female screws 95b (adjusting bolts 97) is small, it is possible to reduce the time required for operation of adjusting the posture.

Each of the fixing side female screws 95a is provided to face each of the mount part side fixing female screws 81a of the plate part 80, at a position different from the recess 94 (at a position which is not overlapped with the recess 94), closer to the outer marginal portion of the flange 90. Therefore, by the screw engagement of the fixing bolts 96, the mount part side fixing female screws 81a and the fixing side female screws 95a couple the flange 90 and the plate part 80 together. For example, the mount part side fixing female screw 81a is engaged with the male screw 96b of the fixing bolt 96 at the tightening force of about 10 N.

In contrast, the adjusting side female screw 95b is provided at a position inside the fixing side female screw 95a in the radial direction, and overlapped with the recess 94 to face each mount part side adjusting female screw 81b of the plate part 80. Therefore, when the adjusting bolt 97 is screwed into the adjusting side female screw 95b, and passes through the bottom surface of the recess 94, the adjusting bolt 97 is inserted into the mount part side adjusting female screw 81b through the space 94a. The diameter of the mount part side adjusting female screw 81b is slightly smaller than the diameter of the mount part side fixing female screw 81a (or the pitch interval in the screw thread of the mount part side adjusting female screw 81b is slightly smaller than the pitch interval in the screw thread of the mount part side fixing female screw 81a). Therefore, the male screw 97b of the adjusting bolt 97 is screwed with the mount part side adjusting female screw 81b at the tightening force larger than 10 N.

In this regard, even if the shaft body 88 of the fixed shaft 82 is inclined from the normal posture by several μm, resistance is produced during guiding of relative movement of the movable cylinder 84, and the resistance may affect the displacement control in the vertical direction. Therefore, normally, operation of adjusting the posture of the shaft body 88 is performed at the time of assembling the air balance mechanism 10.

In the conventional posture adjusting method, as described above, a shim (not shown) is inserted between the shaft body 88 and the flange 90 to adjust the posture of the shaft body 88. For example, in this posture adjusting method, operation of the movable air regulator 86 is stopped, and the shim is inserted between the shaft body 88 and the flange 90. By repeating this operation many times until the posture of the shaft body 88 becomes normal, the adjusting operation is finished. As a result, operation of adjusting the posture is laborious.

In contrast, in the air balance mechanism 10 according to the embodiment of the present invention, based on the operation of twisting the adjusting bolts 97, it is possible to adjust the upright posture of the shaft body 88 coupled to the flange 90. That is, the space 94a between the plate part 80 and the flange 90 into which the adjusting bolts 97 are screwed is formed by the recess 94. Therefore, by changing the screw-in level (amount) at which the adjusting bolts 97 are screwed into the plate part 80 and the flange 90, it is possible to slightly deform the portion of the flange 90 having the recess 94.

That is, in the case where the shaft body 88 is inclined, for example, the operator screws the adjusting bolt 97 on the side opposite to the direction in which the shaft body 88 is inclined, into the deeper side of the mount part side adjusting female screw 81b. As a result, since the flange 90 is inclined toward the side into which the adjusting bolt 97 is screwed, the shaft body 88 coupled to the upper surface of the flange 90 moves to cancel the inclination of the posture as well. Therefore, the operator can easily adjust the shaft body 88 to take the normal posture (i.e., posture where the shaft body 88 is completely in parallel to the vertical direction of the Y-axis slider 54). It is a matter of course that, at the time of adjustment, the operator can loosen the adjusting bolt 97 screwed in the same direction as the direction in which the shaft body 88 is inclined.

Referring back to FIG. 1, the pair of movable cylinders 84 of the air balance mechanism 10 has a cylindrical shape having the bottom at its upper end. An internal space 84a is formed inside each of the movable cylinders 84. The diameter of the internal space 84a is slightly larger than the outer diameter of each of the fixed shafts 82. The movable cylinder 84 is overlapped with the fixed shaft 82, from above the fixed shaft 82 to establish the non-contact state between the inner circumferential surface of the movable cylinder 84 and the outer circumferential surface of the shaft body 88. Further, the length of each of the movable cylinders 84 in the axial direction is shorter than the length of each of the fixed shafts 82 in the axial direction.

Further, a bridge frame 98 is provided at the lower ends of the pair of movable cylinders 84. The bridge frame 98 is bridged between the Y-axis slider 54 and the movable cylinders 84 to transmit the weight of the movable element 60 toward the movable cylinders 84. The bridge frame 98 has a thickness to attain the sufficient rigidity, and the bridge frame 98 is coupled to the Y-axis slider 54 and the movable cylinders 84 by suitable coupling means (screws, welding, etc.).

As shown in FIG. 4A, a through hole 98a is formed inside the bridge frame 98. The diameter of the through hole 98a substantially matches the diameter of the internal space 84a of the movable cylinder 84. Further, non-contact seal structure 100 is fixed to the lower side of the bridge frame 98. The seal inner surface of the non-contact seal structure 100 protrudes inward to loosely close the through hole 98a so as to reduce the leaking pressure in the internal space 84a, while maintaining the non-contact state against the outer circumferential surface of the shaft body 88. For example, in the case where the fixed shaft 82 takes the normal posture, the non-contact seal structure 100 has a clearance C of several μm between the seal inner surface and the outer circumferential surface of the shaft body 88.

Further, as shown in FIGS. 2 and 4A, the movable air regulator 86 of the air balance mechanism 10 supplies/discharges the movable air to/from the internal space 84a of the pair of movable cylinders 84 at suitable timings through the flow passages 88a of the pair of fixed shafts 82. The movable air changes the air pressure in the movable cylinders 84, and small quantity of the movable air is discharged from the non-contact seal structure 100. In this manner, when the Y-axis slider 54 moves in the vertical direction, drive control of the feed axis mechanism 50 for the Y-axis and the drive control of the air balance mechanism 10 are implemented. Thus, the load of the movable element 60 can be received in a distributed manner.

Further, at the time of adjusting the posture of the fixed shafts 82, the movable air regulator 86 functions as an air supply unit for supplying adjusting air CA by operation of an operator. The quantity of the adjusting air CA is smaller than the quantity of the movable air. The adjusting air CA flows into the internal space 84a of the movable cylinders 84, and small quantity of the adjusting air CA is discharged from a lower position of the non-contact seal structure 100.

The air balance mechanism 10 according to the embodiment of the present invention basically has the above structure. Hereinafter, the method of adjusting the posture of the air balance mechanism 10, and its effects will be described.

As shown in FIG. 2, at the time of assembling the air balance mechanism 10, firstly, the operator couples the shaft body 88 and the flange 90 that are formed beforehand, by the coupling bolts 92. As a result, the shaft body 88 and flange 90 are combined together to produce the fixed shaft 82. Further, before attaching the fixed shaft 82 to the plate part 80 of the air balance mechanism 10, the plate part 80 is fixed to the upper surface of the Z-axis slider 44.

Further, in the posture adjusting method, a fixing step of fixing the fixed shaft 82 to the plate part 80 is performed. In this case, the operator positions the flange 90 on the upper surface of the plate part 80, and screws the fixing bolts 96 into the fixing side female screw 95a of the flange 90 and the mount part side fixing female screw 81a of the plate part 80. The plurality of fixing bolts 96 are inserted until the heads 96a of the fixing bolts 96 firmly engage with the flange 90. Thus, the plate part 80 and the flange 90 are fixed together securely.

Further, after fixing the fixed shafts 82 and the plate part 80 together, the operator screws the adjusting bolts 97 into the adjusting side female screws 95b of the flange 90, the space 94a, the mount part side adjusting female screws 81b of the plate part 80. At this time, the plurality of adjusting bolts 97 are screwed loosely in a manner to softly engage with the flange 90. In this manner, fixing before posture adjustment of the fixed shafts 82 is finished. The movable cylinders 84 are overlapped with the fixed shafts 82, and the movable air regulator 86 is connected to the fixed shafts 82.

Then, after the fixing step, the operator performs an adjusting step of adjusting the posture of each of the fixed shafts 82. This adjusting step may preferably be performed at the working site such as a factory, at the time of installing the machine tool 12. In the adjusting step, as shown in FIGS. 4A and 4B, predetermined quantity of the adjusting air CA is supplied from the movable air regulator 86. When the adjusting air CA supplied from the movable air regulator 86 flows into the fixed shafts 82, the adjusting air CA passes through the flow passages 88a, and flow upward. Then, the adjusting air CA is supplied to the internal space 84a of each of the movable cylinders 84. After the adjusting air CA is supplied into the internal space 84a, the internal space 84a has a certain air pressure level. Further, small quantity of the adjusting air CA is released from the non-contact seal structure 100 on the lower side of the movable cylinder 84.

Then, as shown in FIG. 4A, in the case where the shaft body 88 of the fixed shaft 82 is inclined from the vertical axis, the distance between the seal inner surface of the non-contact seal structure 100 and the clearance C of the outer circumferential surface of the shaft body 88 partially becomes large. As a result, large quantity of the adjusting air CA is leaked out from a lower position of the non-contact seal structure 100. That is, the operator can determine whether the posture of the fixed shaft 82 is normal or abnormal based on the quantity of the adjusting air CA which is released from the movable cylinder 84.

In the case where the posture of the fixed shaft 82 is inclined, as shown in FIG. 4B, the operator twists one or a plurality of adjusting bolts 97, and changes the screw-in level to adjust the posture of the fixed shaft 82. By changing the screw-in level, the pressure applied from the heads 97a of the adjusting bolts 97 to the portion of the flange 90 is increased or decreased. Thus, for example, the flange 90 moves toward the space 94a to cause small deformation at its upper surface, and changes the posture of the shaft body 88.

In this regard, even if the posture of the fixed shaft 82 is inclined, since the inclination is small, it is difficult for the operator to recognize whether the posture of the fixed shaft 82 has become normal or not (assuming that the posture is inclined to a large extent, it is expected that other factors are present, e.g., fixing by any of the fixing bolts 96 is insufficient). Therefore, also during the operation of twisting the adjusting bolts 97, the operator checks the quantity of the adjusting air CA released from the lower position of the non-contact seal structure 100, and when the air quantity is decreased (or becomes almost zero), the operator determines that the posture of the fixed shaft 82 has become normal. In this manner, it is possible to finish the operation of adjusting the posture of the fixed shaft 82 in a short period of time suitably.

As described above, in the air balance mechanism 10 according to the embodiment of the present invention, with the simple structure including the space 94a of the flange 90, the fixing bolts 96, and the adjusting bolts 97, it is possible to adjust the posture of the fixed shafts 82 highly accurately in a short period of time. That is, in the state where the fixing bolt 96 is screwed into the outer position of the flange 90 exposed from the shaft body 88 for fixing the flange 90, by twisting the adjusting bolt 97 inside the fixing bolt 96, the screw-in level of the adjusting bolts 97 is changed as necessary. By the change of the screw-in level, it is possible to finely adjust the posture of the fixed shaft 82 easily.

In this case, at the time of adjusting the posture, the movable air regulator 86 supplies the adjusting air CA into the movable cylinder 84. Therefore, the operator can determine whether or not the posture of the fixed shaft 82 is normal based on the change in the quantity of the air released from the movable cylinder 84. Thus, it becomes possible to further improve the efficiency of the operation.

Further, since the axial center of the shaft body 88 is aligned with the center point of the flange 90, it is possible to equally distribute the load of the fixed shafts 82 applied to the plate part 80. Moreover, since the recess 94 has the perfectly circular shape concentric with the flange 90, and the diameter of the recess 94 is larger than the outer diameter of the shaft body 88, by the twisting operation of the adjusting bolt 97, it is possible to facilitate deformation of the portion having the recess 94, and adjust the posture of the fixed shaft 82. Additionally, the fixing bolt 96 and the adjusting bolt 97 are arranged in parallel to each other in the radial direction of the flange 90. Therefore, when the adjusting bolt 97 is twisted, the fixing bolt 96 serves as a pivot point (fulcrum), and the flange 90 can be deformed easily in the radial direction on the opposite side.

Further, in the air balance mechanism 10, the tightening force of the fixing bolts 96 is larger than the tightening force of the adjusting bolts 97. Therefore, the posture of the fixed shaft 82 adjusted by the adjusting bolts 97 can be maintained securely. Moreover, since the fixing bolt 96 and the adjusting bolt 97 have the same shape, the same bolt can be used for both of the fixing bolt 96 and the adjusting bolt 97. Therefore, further improvement in the efficiency of the operation is achieved.

The present invention is not limited to the above described embodiment. It is a matter of course that various modifications can be made without departing from the gist of the present invention.

What is claimed is:

1. An air balance mechanism, comprising:
   a mount part;
   a shaft provided with a flange at one end thereof, the flange being fixed to the mount part; and
   a cylinder configured to cover the shaft, and configured to be movable relative to the shaft;
   wherein the mount part and the flange are in contact at a contact portion, and additionally, a clearance gap is provided between the mount part and the flange, and a longitudinal axis of the shaft passes through the clearance gap; and
   wherein the air balance mechanism further comprises:
   at least one fixing bolt configured to fix the flange and the mount part at the contact portion at a position different from the clearance gap; and
   at least one adjusting bolt configured to be screwed into the mount part and through the flange and clearance gap so as to allow for posture of the shaft to be adjusted.

2. The air balance mechanism according to claim 1, further comprising:

an air supply unit configured to supply air into the cylinder at a time of adjusting the posture of the shaft.

3. The air balance mechanism according to claim 1, wherein the flange has a perfectly circular shape in a plan view, and the flange is fixed in a manner that an axial center of a portion extending from the shaft is aligned with a central point of the flange;

the clearance gap is formed as a recess within the flange; and the recess has a perfectly circular shape concentric with the flange and a diameter of the recess is larger than an outer diameter of the portion extending from the shaft.

4. The air balance mechanism according to claim 3, wherein the at least one fixing bolt and the at least one adjusting bolt are arranged in parallel to each other in a radial direction of the flange.

5. The air balance mechanism according to claim 1, wherein the mount part includes a plurality of female screws configured to allow the at least one fixing bolt and the at least one adjusting bolt to be screwed into the plurality of female screws; and in the plurality of female screws, tightening force of the at least one adjusting bolt is larger than tightening force of the at least one fixing bolt.

6. The air balance mechanism according to claim 1, wherein the at least one fixing bolt and the at least one adjusting bolt have the same shape.

7. A machine tool, comprising:

a tool spindle to which a rotary tool is mounted;

a worktable to which a workpiece is fixed; and the air balance mechanism according to claim 1.

8. A method of adjusting posture of an air balance mechanism, the air balance mechanism comprising:

a mount part;

a shaft provided with a flange at one end thereof, the flange being fixed to the mount part;

a cylinder configured to cover the shaft, and configured to be movable relative to the shaft;

wherein the mount part and the flange are in contact at a contact portion, and additionally, a clearance gap is provided between the mount part and the flange, and a longitudinal axis of the shaft passes through the clearance gap;

the method comprising the steps of:

fixing the flange and the mount part at the contact portion at a position different from the clearance gap, using at least one fixing bolt; and adjusting posture of the shaft after the fixing step, by screwing at least one adjusting bolt into the mount part and through the flange and the clearance gap.

9. The method of adjusting the posture of the air balance mechanism according to claim 8, wherein in the adjusting step, air is supplied into the cylinder by an air supply unit to adjust the posture of the shaft based on the quantity of the air released from the cylinder.

* * * * *